May 26, 1925.

G. R. ANDERSON

DRIER

Filed Jan. 10, 1923  2 Sheets-Sheet 1

1,539,230

Geo. R. Anderson INVENTOR.

BY
ATTORNEYS.

May 26, 1925. 1,539,230
G. R. ANDERSON
DRIER
Filed Jan. 10, 1923  2 Sheets-Sheet 2
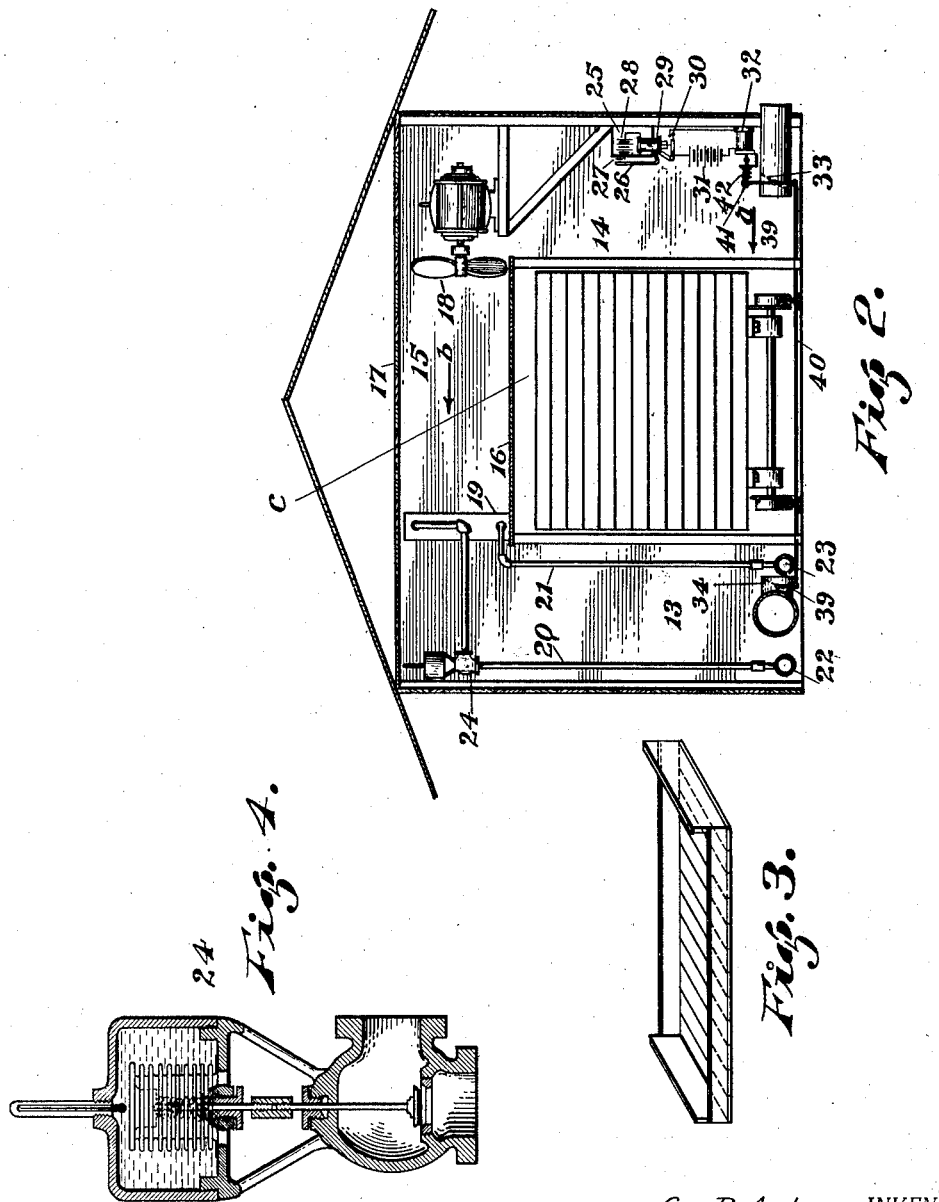
Geo. R. Anderson INVENTOR.
BY
ATTORNEYS.

Patented May 26, 1925.

1,539,230

UNITED STATES PATENT OFFICE.

GEORGE R. ANDERSON, OF SANTA ROSA, CALIFORNIA.

DRIER.

Application filed January 10, 1923. Serial No. 611,757.

*To all whom it may concern:*

Be it known that I, GEORGE R. ANDERSON, a citizen of the United States, residing at Santa Rosa, county of Sonoma, and State of California, have invented new and useful Improvements in a Drier, of which the following is a specification.

This invention relates to driers or dehydrators and especially to that type employed for drying fruits, vegetables and other products.

From actual experience and close observation, while experimenting with so-called artificial or hot air drying of fruits, vegetables, etc., I have found that if a high grade dried fruit is desired, when taste, appearance and keeping qualities are considered, the fruit when dried by hot air should be subjected to a gradual increase in temperature during the beginning of the drying operation and similarly to a gradual decrease in temperature during finishing of the drying operation. Further, that the humidity or moisture content of the air must be carefully regulated to obtain the best results, and also that the velocity and direction of the flowing air current must be carefully regulated to obtain a uniform product. For instance, if the temperature of the air at the beginning of the drying operation is too high, the fruit bursts or cracks allowing the fruit juices to run out and as such produces a product of an inferior appearance and low sugar content.

If too much moisture is present in the air, fermentation is liable to start and once started, even though very slight, often causes spoiling of the fruit at a later date.

If the air employed is too dry, it causes the peel of the fruit to become hard, producing what is commonly termed "case hardening", and if the fruit does become case hardened it is difficult to further dry the same as the moisture content is only liberated with difficulty.

I have further found that when the fruit has once started drying, that is, after it begins to shrink and has liberated a certain amount of moisture that the temperature can be gradually raised, but care must be taken when employing higher temperatures to carefully regulate the moisture content as detrimental results are otherwise obtained.

The drier or evaporator forming the subject matter of the present application is a so-called tunnel type of drier. There are a number of so-called tunnel type driers in use today but the present drier differs radically therefrom.

In one form of tunnel drier in use the heated air enters at one end of the tunnel, then passes throughout the length thereof, and discharges at the opposite end, a forced draft being usually required when the tunnel is of any length. In some instances the air enters the center portion of the tunnel and discharges towards the ends. In this case, as in the previous instance mentioned, the result obtained is an unevenly dried product as the fruit first acted upon by the air tends to dry to a greater extent than the fruit which is positioned adjacent the discharging point of the air. In other types of tunnel driers the fruit enters the exhaust end of the tunnel and finishes the drying operation when the hot air intake is reached. This type of drier is called a counter-current drier, and other tunnel driers which enter the fruit at the end nearest the heating system are termed parallel current driers. Another type of drier employs a so-called helical air flow, and still other types employ a vertical flow and a transverse flow. The present invention relates to the latter inasmuch as the air currents are passed through the trays in a direction transverse of the tunnel.

The object of the present invention is to generally improve and simplify tunnel driers of this type; to provide a tunnel drier in which trucks loaded with trays may be intermittently and successively advanced through the tunnel and during successive stages of advancement subjected to transverse flowing air currents of varying temperature and humidity content; to provide a tunnel type of drier which is divided transversely into a series of compartments; to provide means for maintaining a transverse flowing current of air in each compartment; to provide means in each compartment for automatically regulating the temperature of the air; and other means for automatically regulating the moisture content thereof, and further to provide a novel system for heating the air. Other objects will hereinafter appear.

One form which my invention may assume is exemplified in the following description and illustrated in the accompanying drawings, in which—

Fig. 2 is a transverse section of the drier.

Fig. 3 is a perspective view of one of the drying trays employed.

Fig. 4 is a central vertical section of the thermostat controlled steam valve.

Figure 1:
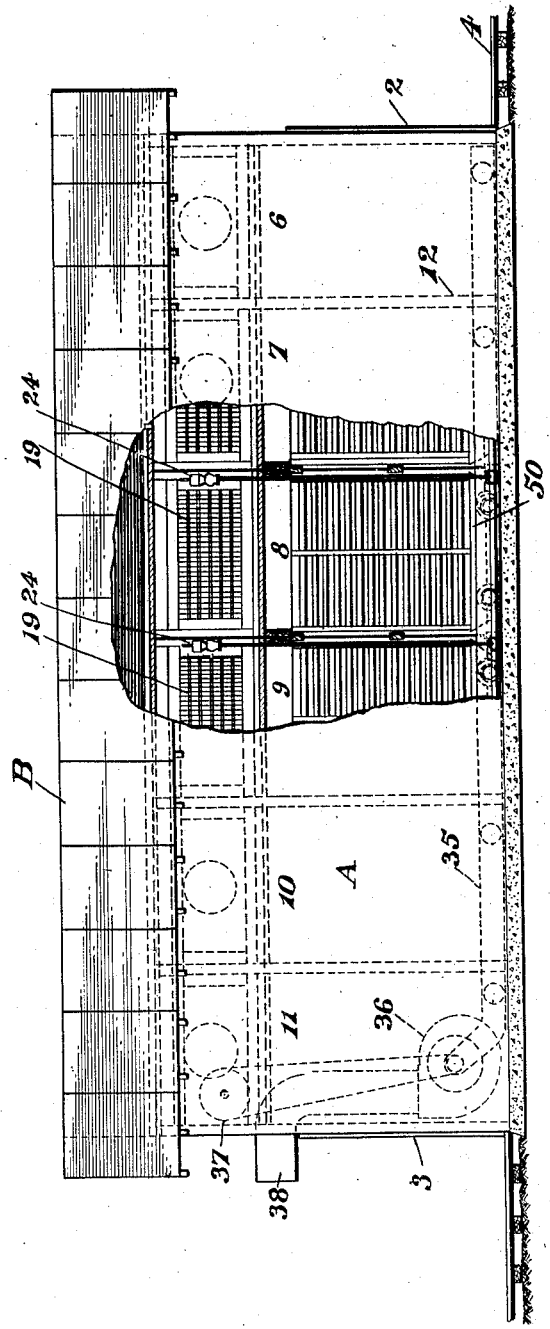
Fig. 1 is a side elevation of the drier with parts broken away to show the interior structure.

Referring to the drawings in detail, and particularly to Fig. 1, A indicates a housing constructed of any suitable material. The housing is covered by a roof structure generally indicated at B and a door is placed at each end of the housing as indicated at 2 and 3 to permit entrance and discharge of trucks loaded with trays as will hereinafter be described.

Formed centrally of the housing and extending from end to end thereof is a tunnel generally indicated at C. Extending through the tunnel is a trackway 4, which carries the loaded trucks.

By referring to Figs. 1 and 2, it will be noted that the housing is divided transversely into a series of compartments generally indicated at 6, 7, 8, 9, 10 and 11. There are six transverse compartments illustrated in the present instance but any suitable number may be employed. The compartments are formed by transverse partitions, such as indicated at 12, but these partitions have door like openings formed therein through which the trucks pass when they are transferred from one compartment to another. Each transverse compartment is divided into three compartments, which are generally indicated at 13, 14 and 15, see Fig. 2. The compartments 13 and 14 are disposed one on each side of the tunnel, and the compartment 15, which connects the compartments 13 and 14, is disposed above the tunnel, that is, a horizontally running partition extending from end to end of the tunnel is positioned at the point indicated at 16. This partition forms a roof or ceiling for the tunnel and a floor for the compartment 15. A second longitudinally extending horizontal partition is disposed at the point indicated at 17. This partition is disposed between the partition 16 and the roof B and as such forms a roof or ceiling for the compartment 15 and also for the end compartments 13 and 14. Disposed at one end of the compartment 15 is a fan or blower 18 which may be driven in any suitable manner, and disposed at the opposite end of the compartment 15 is a radiator 19, which is of the honey comb or open type to permit air to freely circulate therethrough. This radiator is heated by means of steam which is admitted through a pipe 20, and the condensate produced by the flow of steam through the radiator is discharged at the lower end thereof and passes out through a pipe 21. Pipes 20 and 21 are connected with mains 22 and 23 running lengthwise of the building; these mains being connected with a boiler which is located at any convenient point and not here illustrated, that is, a boiler may be built in one end of the structure shown in Fig. 1, or it may be housed in a building separate from and independent of the main structure.

As stated in the preamble of this specification means are provided for regulating the temperature of the air which is circulated in each transverse compartment. This is accomplished by employing a thermostat, such as indicated at 24. This thermostat is placed in the line of the pipe 20 and as such automatically regulates the admission of steam to the radiator, for instance, if the air is too cold and the thermostat is set for a certain temperature, it is obvious that it will open and permit a comparatively large flow of steam through the radiator. If the temperature of the air approaches that desired or maintained by the thermostat, the valve closes and the flow of steam is reduced. In this manner a constant and uniform temperature is maintained and as each of the compartments, indicated at 6, 7, 8, 9, 10 and 11, is provided with a radiator and a thermostat which controls the flow of steam therethrough, it is obvious that a fairly low temperature may be maintained in the compartment 6, a higher temperature in the compartment 7, and so on, and that the temperature in the compartments 10 and 11 may be reduced to any point desired, that is, the fresh fruit to be dried first enters compartment 6 where it remains for a predetermined time period. It is then transferred to compartment 7 and so on, and is finally discharged when the drying operation is completed in the compartment indicated at 11. In this manner it is possible to subject the fruit to a comparatively low temperature, then to gradually increase the temperature and finally to lower the temperature before or during the completion of the drying operation.

Means are also employed for automatically maintaining a predetermined moisture content in each compartment. The means employed is a humidostat. Any suitable type of humidostat may be employed and may be positioned at any point convenient in the compartment in which it is placed. A reed type of humidostat is employed in the present instance and is generally indicated at 25. The reed indicated at 26 expands and contracts as the moisture content of the air varies and as such moves into and out of engagement with an electric contact indicated at 27. The contacts close when the moisture content of the air becomes too great and a circuit is thus established through a battery 28 and a relay magnet 29. This relay closes a switch 30 which in turn closes a circuit through a battery 31 and a solenoid magnet 32. This solenoid serves the function of opening and closing two dampers, one damper admitting fresh dry air and the other withdrawing warm humid air. The first named damper is indicated at 33 the second named damper at 34. There is a damper 33 for each compartment and one damper 34 for each compartment. The dampers 34 are disposed in a pipe 35 which extends from end to end of the building, passing through the several compartments indicated at 6, 7, 8, 9, 10 and 11. One end of this pipe is connected with the suction side of a blower 36, which is driven by a motor 37. The exhaust side of this blower discharges through the end of the building, as indicated at 38, and as such serves any one or all of the compartments referred to. The dampers 33 and 34 are pivotally mounted in their respective pipes or conduits and their outer ends are provided with crank arms 39 which are connected by a common link 40. The armature of the solenoid magnet 32 is connected with the link 40 at the point indicated at 41. A spring is interposed between this link and the solenoid, as indicated at 42. This spring tends to push the link 40 in the direction of arrow $a$ and as such retains the dampers in a closed position. However, when the solenoid is energized, the armature is attracted and movement is imparted to the link 40 in a direction opposite to that indicated by arrow $a$. The dampers 33 and 34 are then opened in unison and as the damper 34 is connected with the main suction pipe indicated at 35, it is obvious that a portion of the humid atmosphere contained in a certain transverse compartment will enter the conduit 35 due to the suction action of the blower 36, and as such will be discharged. This removal or withdrawal of a portion of the atmosphere will lower the atmospheric pressure in the compartment and fresh air will thus enter to equalize the pressure through the partially opened damper 33. The removal of air and the inflow of fresh air to replace the same continues until the moisture content drops to a predetermined value. The reed 26, which is actuated by the moisture content, will at that point break the electrical connection through the contact 27 and as such will de-energize the magnet 29 and permit the switch 30 to open. The circuit through the solenoid is thus broken and the spring 42 will again close the dampers 33 and 34 and will retain the same in a closed position until the moisture content of the air again reaches a point where the reed will automatically close the circuit through the relay 29. It should be remembered that each transverse compartment is provided with a humidostat and it is, therefore, possible to maintain a desired moisture content in each compartment, the moisture content of each compartment being predetermined and automatically controlled as each compartment is provided with a thermostat as indicated at 34.

In actual operation a tray is employed, such as indicated in Fig. 3. The fruit is placed on these trays and the trays are stacked one on top of the other on a truck such as indicated at 50. The truck when loaded is placed in the first compartment indicated at 6 and if prunes or similar fruits are being dried, the truck usually remains in the compartment for a period approximatley five hours, that is, it takes approximately thirty hours to completely dry prunes and like fruits, and as such compartments are employed in the present instance, it is obvious that the truck will remain for a period of approximately five hours in each compartment. With the truck placed in the compartment indicated at 6 and the fan 18 set in operation, it is obvious that the air will flow in the direction of arrow $b$, that is, the air passes through the upper compartment 15, the radiator 19, then downwardly through compartment 13, then transversely of the tunnel between the trays upon which the fruit is placed, and finally enters the compartment 14 where it is directed upwardly to the fan. This circulation is continuously maintained and a constant temperature and moisture content is also maintained as these two factors are controlled by the thermostat 24 and the humidostat 25, and any desired temperature and moisture content may be maintained as each controlling instrument may be adjusted to the temperature and moisture content desired. If the temperature becomes too great, it is instantly and automatically taken care of by the thermostat as this will act to reduce the flow of steam through the radiator Similarly, if the moisture content becomes too great, it is automatically taken care of as the humidostat will operate to the extent that it will close a circuit through the relay and this in turn will close the switch 30 which actuates the solenoid 32. When this solenoid is energized, dampers 33 and 34 will remain open until the moisture content is reduced.

When the fruit contained on the truck has been dried to a predetermined extent, it is only necessary to open the door 2 and to advance the truck to the compartment indicated at 7, a truck of fresh fruit being at the same time placed in the compartment 6. The partially dried fruit when entering compartment 7 is subjected to a higher temperature and air containing a greater moisture content. This intermittent cycle of operation is continued as the trucks are transferred from one compartment to another and, as previously stated, temperature and humid content are increased as the trucks are advanced and then gradually decreased as the drying operation is being completed; this particular form of treatment having proven decidedly advantageous as it avoids cracking or bursting of the fruit during the beginning of the drying operation; it prevents fermentation, and also eliminates any chance of case hardening. It may further be stated that a product having a high sugar content, long keeping qualities, and an exceedingly desirable appearance, are obtained and that the labor and care involved on the part of the operators are reduced to a minimum as temperature and moisture regulation is automatically taken care of by the thermostats and humidostats employed. In other words, when a drier of this character has once been started and regulated by a skilled operator, further regulation and attention may be discontinued and unskilled labor may be employed as to the automatic controls will continue to function for an indefinite period.

The use of steam radiators such as shown in the present instance has proven ideal as the temperature control is readily and automatically maintained, and they are of further importance as they have proven ideal when the heating and regulation of air temperatures are considered, that is, intimate contact between the radiator and the air is obtained as all air passing through the upper compartment 15 must discharge through the openings in the radiator during each cycle of operation.

The speed of the fan 18 may be regulated so that the velocity of the air may be increased or decreased. In actual practice a fairly low velocity is maintained as this has proven best when uniform drying is considered. Each fan 18 may be driven by a motor or otherwise, and as the fan in one compartment may rotate in one direction and the fan in the next compartment in an opposite direction, it is obvious that reversal of the air flow between the trays may be maintained when the trucks are advanced from one compartment to the other.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A drier of the character described comprising a housing having a tunnel formed therein and extending from end to end of the housing, a series of separated aligned compartments disposed on each side of the tunnel and dividing the tunnel into a series of transverse compartments, an air duct connecting each set of aligned side and opposed compartments, means for maintaining an independent circulation of air through each set of opposed compartments and through the connecting air duct and also transverse of the tunnel, a radiator in each transverse duct through which the air is circulated, temperature actuated means automatically regulating the flow of steam through each radiator, and means for automatically maintaining a predetermined moisture content in each compartment.

2. A drier of the character described comprising a housing having a tunnel formed therein and extending from end to end thereof, said tunnel being divided into a plurality of transverse compartments, means for maintaining an independent circulation of air in each compartment and transverse of the tunnel, an humidostat in each compartment automatically regulating the moisture content of the air in each compartment, a radiator in each compartment through which the air is circulated, means for supplying steam thereto and a thermostat actuated valve in each compartment regulating the flow of steam through each radiator.

GEORGE R. ANDERSON.